United States Patent
Pelykh (10) Patent No.: US 9,130,920 B2
(45) Date of Patent: Sep. 8, 2015

(54) MONITORING OF AUTHORIZATION-EXCEEDING ACTIVITY IN DISTRIBUTED NETWORKS

(71) Applicant: Zettaset, Inc., Mountain View, CA (US)

(72) Inventor: Konstantin I. Pelykh, Santa Clara, CA (US)

(73) Assignee: ZETTASET, Inc., Mountain View, CA (US)

( * ) Notice: Subject to any disclaimer, the term of this patent is extended or adjusted under 35 U.S.C. 154(b) by 0 days.

(21) Appl. No.: 13/735,210

(22) Filed: Jan. 7, 2013

(65) Prior Publication Data

US 2014/0196115 A1  Jul. 10, 2014

(51) Int. Cl.
*H04L 29/06* (2006.01)

(52) U.S. Cl.
CPC .............. *H04L 63/08* (2013.01); *H04L 63/0428* (2013.01); *H04L 63/1425* (2013.01)

(58) Field of Classification Search
CPC ......... H04L 67/00; H04L 45/00; H04L 63/08; H04L 63/1425; H04L 63/0428; H04L 29/06; G06F 17/00; G04L 29/06
USPC ............................................................ 726/4
See application file for complete search history.

(56) References Cited

U.S. PATENT DOCUMENTS

| | | | |
|---|---|---|---|
| 6,606,708 B1 | 8/2003 | Devine et al. | |
| 7,089,584 B1 | 8/2006 | Sharma | |
| 7,225,462 B2 * | 5/2007 | Bass et al. | 726/6 |
| 7,318,072 B2 | 1/2008 | Margolus | |
| 7,363,326 B2 | 4/2008 | Margolus | |
| 7,571,180 B2 * | 8/2009 | Minyailov | 1/1 |
| 7,644,432 B2 * | 1/2010 | Patrick et al. | 713/165 |
| 7,844,717 B2 | 11/2010 | Herz et al. | |
| 7,979,899 B2 | 7/2011 | Guo et al. | |
| 8,060,917 B2 | 11/2011 | Chung et al. | |
| 8,095,516 B2 | 1/2012 | Margolus et al. | |
| 8,099,788 B2 | 1/2012 | Munday | |
| 2002/0138446 A1 * | 9/2002 | Antonin et al. | 705/67 |

(Continued)

OTHER PUBLICATIONS

White, Storage & Analysis at Internet Scale, Hadoop the Definitive Guide Second Edition, O'Reilly Media, Inc., 2011, pp. 1-625, 2nd Edition, Yahoo Press, Sebastopol, CA USA.

(Continued)

*Primary Examiner* — Chau Le
*Assistant Examiner* — Muhammad Chaudhry
(74) *Attorney, Agent, or Firm* — Marek Alboszta (57) ABSTRACT

A network security layer with a role mapping component with a current role mapping between services and access permissions is provided between a user and the services. A multi-tenancy module with current membership mapping is also provided. The security layer has a network authentication protocol for user authentication at log-in. Snapshots of a baseline role mapping between services and permissions are taken at certain times. The role mapping component verifies snapshots at set intervals, and when the user performs certain actions, the current role mapping is compared with the baseline role mapping. Upon discrepancy, the role mapping component executes a set of rules, including forceful log-out to prevent system intrusion. Comparison of current membership mapping with a baseline membership mapping can also be applied. The security layer can thus monitor authorization-exceeding modifications to baseline policies attempted by logged-in and initially authorized users.

20 Claims, 5 Drawing Sheets

(56) References Cited

U.S. PATENT DOCUMENTS

| | | | |
|---|---|---|---|
| 2006/0282662 | A1 | 12/2006 | Whitcomb |
| 2008/0172727 | A1 | 7/2008 | Cheng et al. |
| 2010/0027554 | A1* | 2/2010 | Kuthan et al. ............... 370/401 |
| 2010/0251328 | A1 | 9/2010 | Syed et al. |
| 2010/0306286 | A1 | 12/2010 | Chiu et al. |
| 2010/0325422 | A1 | 12/2010 | Gnanasambandam et al. |
| 2011/0055559 | A1* | 3/2011 | Li et al. .................... 713/165 |
| 2011/0225200 | A1* | 9/2011 | Danis et al. ................ 707/783 |
| 2011/0246460 | A1* | 10/2011 | Hsieh et al. ................ 707/736 |
| 2011/0247046 | A1* | 10/2011 | Gross et al. ..................... 726/1 |
| 2011/0252463 | A1 | 10/2011 | Yeleshwarapu et al. |
| 2011/0305331 | A1* | 12/2011 | Hughes et al. ........... 379/202.01 |
| 2012/0054182 | A1 | 3/2012 | Gupta et al. |
| 2012/0090037 | A1* | 4/2012 | Levit ............................. 726/28 |
| 2012/0110651 | A1 | 5/2012 | Van Biljon et al. |
| 2012/0185913 | A1 | 7/2012 | Martinez et al. |
| 2012/0290582 | A1* | 11/2012 | Oikarinen .................... 707/741 |
| 2014/0122571 | A1* | 5/2014 | Huang et al. ................ 709/203 |
| 2014/0188804 | A1* | 7/2014 | Gokhale et al. ............. 707/645 |

OTHER PUBLICATIONS

Yan, et al., Monsoon: Policy-Based Hybrid Cloud Management for Enterprises, Hewlett Packard Development Company, 2012, pp. 1-8, Hewlett Packard, USA.

Zettaset, SHadoop™—Security for Hadoop, Zettaset Orchestrator Powered by Hadoop, Zettaset, Mountainview CA, USA, date: 2012.

Baban, Diploma Project—BlobSeer Client Access Control, Computer Science & Engineering Dept., 2011, pp. 1-37, Politechnica University of Bucharest, Romania.

Becherer, Hadoop Security Design Just Add Kerberos? Really?, iSEC Partners, 2010, pp. 1-8, iSEC Partners, Inc, USA.

Gupta, Inside Security Model of Microsoft Dynamics AX 2012 'Role-Based & Extensible Data Security, Flexible Authentication', diTii.com, 2011, pp. 1-3, diTii, USA.

Harada & Samgita, IBM Cognos Proven Practices: Dynamic Reporting with Role-based Security, Developer Works, 2010, pp. 1-16, IBM, USA.

Holl, Roussos & Voll, Policy Driven Management of Data Sets, usenix.org, 2007, pp. 131-140 of the Proceedings of the 21st LISA Conference, Usenix Assoc., Dallas TX.

Loganayagi & Sujatha, Enhanced Cloud Security by Combining Virtualization & Policy Monitoring Techniques, Science Direct, 2012, pp. 654-661, Procedia Engineering,USA.

Loganayagi, et al., Enhancing Cloud Security through Policy Monitoring Techniques, Springer.com, 2011, pp. 270-275, vol. 250, VV Das and N thankachan (Eds): CIIT , India.

Pelykh, Antonov & Kim, Design of Role Based Access Control in Zettaset Orchestrator Platform, Zettaset.com, 2012, pp. 1-24, Zettaset.

Phanse, et al, Design & Demonstration of Policy-Based Management in a Multi-Hop Ad Hoc Network, Science Direct, 2003, pp. 389-401, Elsevier BV,Alexanderia, VA USA.

Shin, et al., Toward Role-based Provisioning & Access Control for Infrastructure as a Service, Journal of Internet Service & Application, 2011, pp. 243-255 vol. 2, #3, Springer.

* cited by examiner

MONITORING OF AUTHORIZATION-EXCEEDING ACTIVITY IN DISTRIBUTED NETWORKS

FIELD OF THE INVENTION

This invention relates generally to security layers in distributed networks supporting distributed applications, and more particularly to security layers with provisions for monitoring authorization-exceeding activity by logged-in and authenticated users.

BACKGROUND ART

In today's connected world, the many accessible networks and clusters within them present a valuable resource for small and large users. By leveraging tasks on distributed applications running in the cloud, any user equipped with even a low-performance client device can execute very computationally challenging jobs rapidly.

Among the many services residing in the cloud the Hadoop framework and its sub-projects such a Hive, Hbase, Pig, Oozie are gaining widespread acceptance of users and companies who need to process large amounts of data using inexpensive commodity hardware. Hadoop is becoming a popular tool for security organizations having data needs that legacy database software cannot handle.

With the power that Hadoop provides come security risks. While Hadoop Distributed File System (HDFS) provides an abstraction which implements a permission model for files and directories, in most situations it is not enough to meet the high security requirements imposed in companies working with sensitive information, e.g (financial transactions, health records, users' personal information, criminal records).

To address some of the security issues, in 2009 Hadoop developers introduced Simple Authentication and Security Layer (SASL) with Kerberos to establish user identity. Unfortunately, the design of security in Hadoop produces a number of concerns. First, because of the emphasis on performance and the perception that encryption is expensive Hadoop uses a poor default SASL Quality of Protection (QoP). Second, the new Hadoop security design relies on the use of HMAC-SHA1, a symmetric key cryptographic algorithm. In the case of the Block Access Token the symmetric key used in the HMAC-SHA1 will need to be distributed to the Name Node and every Data Node in the cluster. This is potentially hundreds or thousands of geographically distributed machines or nodes. If the shared key is disclosed to an attacker the data on all Data Nodes is vulnerable.

Third, in some Hadoop deployments HDFS proxies are used for server-to-server bulk data transfer. The Hadoop platform uses the proxy IP addresses, and a database of roles, in order to perform authentication and authorization. IP addresses are not a strong method of authentication. This could lead to the bulk disclosure of all data the HDFS proxy is authorized to access.

What is needed is a way of monitoring authorization-exceeding requests by users that are logged into services on a distributed network consisting of one or more clusters in the most effective and least disruptive manner.

Furthermore, HDFS was not designed with multi-tenancy support in mind. Current HDFS architecture allows only a single namespace for the entire cluster and the same namespace is shared between all cluster users. However, in many secured installations the cluster is used in a multi-tenant environment where many organizations share the cluster and require isolation between its sub-organization units.

In 2011 Hadoop developers introduced a concept of HDFS Federation, which facilitates multi-tenancy and namespace separation by splitting one namenode into multiple namenodes, each one managing its part of the namespace. Unfortunately, such an approach does not work for Hadoop installations that are using a single namenode for all of their namespace. Additionally, for some organizations consisting of a large number of organization units (e.g., 100 or more) dedicating a new namenode for every organization unit may not even be possible due to hardware limitations and cost of operation.

Therefore, in addition to monitoring of authorization-exceeding activity by users, it is also important to provide such solutions in environments that support multi-tenancy. These solutions need to be compatible with new approaches to namespace separation in single namenode environments.

OBJECTS AND ADVANTAGES OF THE INVENTION

In view of the shortcomings of the prior art, it is an object of the invention to monitor authorization-exceeding requests in distributed networks with minimal disruption to distributed services, such as Hadoop.

It is another object of the invention to provide a useful system and method to react to authorization-exceeding requests and to restore or reset user permissions in an effective manner.

It is yet another object of the invention to provide for monitoring of authorization-exceeding requests while not having to provision a user on all nodes.

It is still another object of the invention to provide for multi-tenancy support and data isolation in single namenode Hadoop clusters.

These and many other objects and advantages of the invention will become apparent from the ensuing description.

SUMMARY OF THE INVENTION

The objects and advantages of the invention are accrued by deploying a security layer for monitoring authorization-exceeding modifications performed by a user of services in a distributed network. In particular, the security layer is provided between the user and the services that the user wishes to access on the distributed network. The security layer has a role mapping component that is imparted with a current role mapping between the services available on the distributed network and requisite permissions to access these services through frontend. The role mapping component preferably uses Role Based Access Control (RBAC) as an access control model. The model typically involves information about permissions, roles and users. The security layer also has a network authentication protocol for authenticating the user. The network authentication protocol is deployed at a log-in time to authenticate the user.

Another aspect of the invention is embodied by the concept of an organization unit to facilitate a multi-tenancy environment in a single namenode Hadoop Distributed File System (HDFS). An organization unit represents a part of an organization, a subgroup or a department within one company. Exemplary organization units can be the logical departments of a single organization, such as "HR department", "accounting department", "engineering department", etc. Every organization unit has a dedicated directory on HDFS and an associated group of users that has access to a given organization unit. The organization unit is an isolation unit, so that users of one organization unit are not able to browse files, shared documents located under another organization unit.

As part of the invention, a set of entities and algorithms to support multi-tenancy are introduced. These include template files describing HDFS file structure and permission model for organization units, Hadoop group mapping component used to resolve HDFS groups for HDFS-specific operations, and an algorithm to dynamically generate HDFS groups based on user internal roles.

In accordance with the invention, snapshots of a baseline role mapping between the available services and requisite permissions are taken at time intervals defined by an application configuration. These snapshots are stored in a remote, secured location accessible to the security layer via a secured sockets layer connection. The role mapping component performs snapshot verification at time intervals specified in a configuration, and when the user performs a certain action, e.g., issues a command to make a change/modification that affects baseline permissions. At such times, the current role mapping in the role mapping component is compared with the baseline role mapping in the remote, secured location. If a discrepancy is detected, then the role mapping component executes a set of rules, which can include forceful log-out of active users, in order to prevent possible system intrusion. The security layer can thus monitor any authorization-exceeding modifications to baseline policies attempted by the user. Unauthorized modifications can be detected in a timely manner and prevented.

The distributed network typically has one or more clusters that are geographically separated and the service includes one or more distributed services. Conveniently, the one or more distributed services have corresponding frontends to provide access and facilitate user interaction. For example, the distributed service is Hadoop and any Hadoop based project, such as Hadoop Distributed File System, Hive, Pig, Oozie, HBase, Map Reduce, Sqoop, HCatalog, Mahaut and the like.

In a preferred embodiment of the invention, the baseline role mapping is used to reset or restore the current role and organization unit mapping. This function can be performed to protect the network whenever access to the distributed network by a user performing authorization-exceeding actions is detected. An authentication module executes the network authentication protocol. The authentication module belongs to the security layer and communicates with a credentials database that may be remote. For example, the credentials database is Open Lightweight Directory Access Protocol (OpenLDAP) and the communication with it is performed via Java Naming and Directory Interface (JNDI).

In many embodiments it is advantageous to provide for logging of user actions, including authorization-exceeding actions, in a centralized logging component. Thus, an audit trail for any action can be provided. Preferably, the centralized logging component is remote from the security layer for added safety.

A user of the distributed services in the distributed network does not need to be provisioned on all nodes of the network. This is a very advantageous condition.

It is convenient to log the jobs produced in the distributed network by the user's actions. Such log can be maintained at a location remote from the security layer for added safety.

In some embodiments of the invention, a Role Based Security Service Layer is provided. The Role Based Security Service Layer is in communication with the credentials database and uses the RBAC model for access control. A local definition of the user is created in this embodiment and made accessible to the nodes of the distributed network. Such configuration relieves the nodes from having to independently provision the user to cluster nodes and it enables support for multi-tenant environment in a single node HDFS. In creating the local definition, the user can be mapped to at least one of the OpenLDAP organization unit membership groups and at least one of OpenLDAP permission groups. OpenLDAP membership groups describe user's tenancy in one of the organization units and LDAP permission group is associated with a list of granted permissions to user's role. In doing so, a multi-tenancy module can be used to resolve user's membership in available organization units and the role mapping component can be used to resolve available roles and to determine a combined set of permissions for any specific user. In these embodiments, OpenLDAP is the preferred credentials database.

Finally, for further safety, the invention extends to the use of encryption of user data with personal private/public keypairs issued in the distributed network. The encrypting step can be performed by the Hadoop Input/Output system.

The present invention, including the preferred embodiment, will now be described in detail in the below detailed description with reference to the attached drawing figures.

DETAILED DESCRIPTION

The drawing figures and the following description relate to preferred embodiments of the present invention by way of illustration only. It should be noted that from the following discussion, alternative embodiments of the methods and systems disclosed herein will be readily recognized as viable options that may be employed without departing from the principles of the claimed invention. Likewise, the figures depict embodiments of the present invention for purposes of illustration only. One skilled in the art will readily recognize from the following description that alternative embodiments of the methods and systems illustrated herein may be employed without departing from the principles of the invention described herein.

Figure 1:
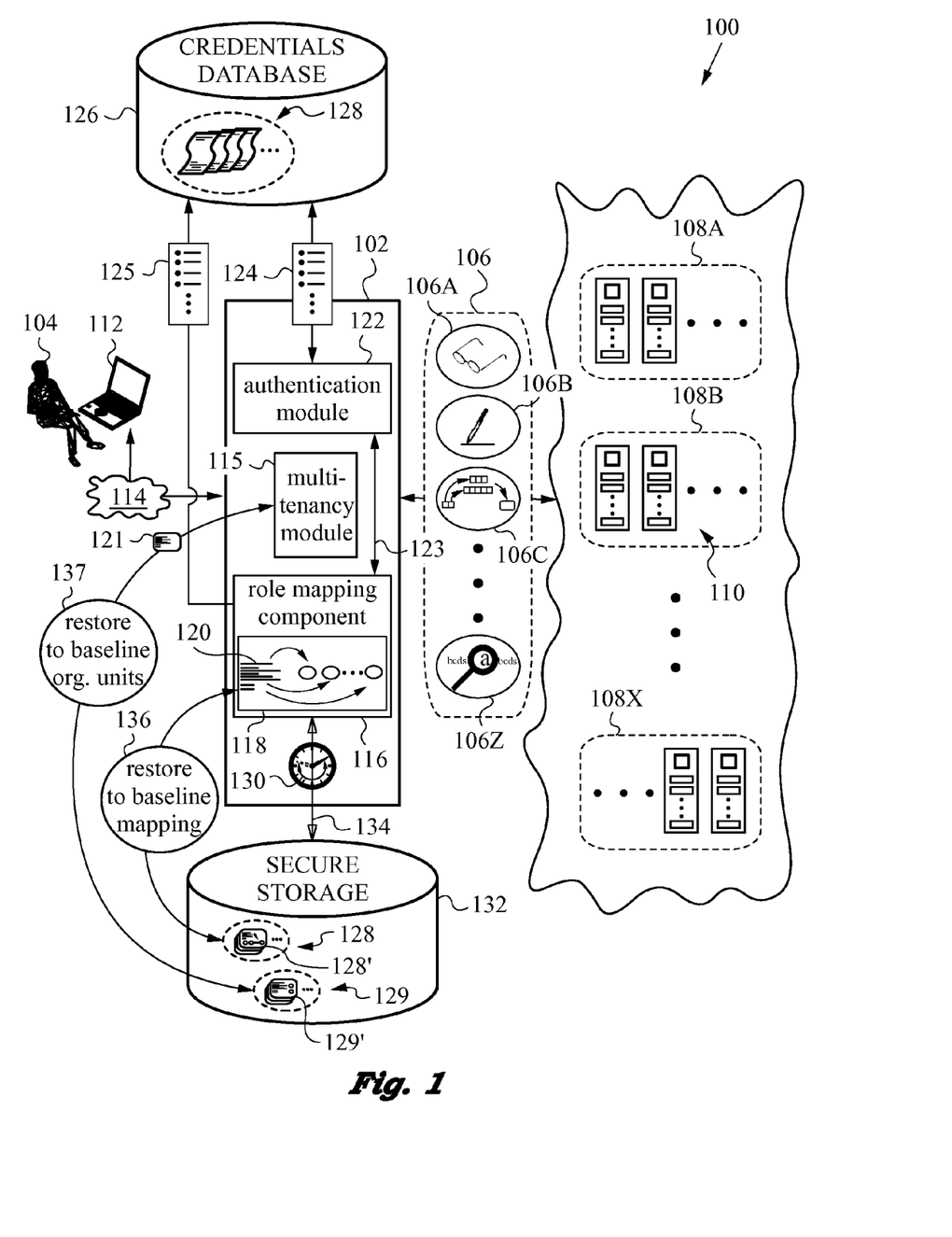
FIG. 1 is a high-level diagram of the salient aspects of a distributed network with a security layer according to the invention.

The present invention will be best understood by initially referring to the high-level diagram of FIG. 1. This drawing schematically illustrates a portion of a distributed network 100 with a security layer 102 interposed between a user 104 and services 106 available on distributed network 100. Only some of services 106, such as read 106A, write 106B, MapReduce 106C and search 106Z are shown explicitly in the drawing. It will be understood by those skilled in the art, however, that any supported type of service 106 can be made available to user 104 on distributed network 100. Furthermore, distributed network 100 typically includes many geographically separate clusters 108A, 108B, . . . , 108X with nodes 110.

User 104 deploys their client equipment 112, e.g., a device such as a laptop, a tablet, a smartphone, a mobile device or a desktop computer to establish a connection via a communication network 114 to distributed network 100. Communication network 114 can include a Wide Area Network (WAN) like the Internet or a Local Area Network (LAN). The physical connection can be supported by any communications infrastructure including wired, optical and wireless. Furthermore, services 106 typically have a user interface or frontend to enable user 104 to deploy any selected service 106 on nodes 110 of network 100.

In accordance with the invention, security layer 102 is interposed or provided between user 104 and services 106 that user 104 wishes to access and deploy on distributed network 100. Security layer 102 has a role mapping component 116 that is supplied or imparted with a current role mapping 118 between services 106 available on distributed network 100 and requisite permissions 120 to access services 106. Permissions 120 include information about groups and users and are discussed in more detail below, but it should be noted at this point, that role mapping component 116 preferably uses Role Based Access Control (RBAC) as an access control model.

Security layer 102 also has an authentication module 122 for executing a network authentication protocol 124 to authenticate user 104. Preferably, authentication module 122 belongs to security layer 102 and communicates with a credentials database 126 that is remote. In the preferred embodiment, credentials database 126 is Open Lightweight Directory Access Protocol (OpenLDAP) and it contains corresponding credentials 128 formatted in accordance with conventions known to those skilled in the art.

The choice of LDAP as preferred is due to the fact that it is based on the X.500 standards for directory sharing (X.500 is a series of computer networking standards that cover electronic directory services). The X.500 standards have a low level of complexity and are not resource intensive. An X.500 compliant directory contains hierarchical and categorized information that can include information such as names, addresses and phone numbers. Such a directory allows one to consolidate information for an entire organization into a central repository. For example, rather than managing user lists for each group within an organization, LDAP can be used as a central directory accessible from nodes 110 of non-secure network 100. Furthermore, because LDAP supports Secure Sockets Layer (SSL) and Transport Layer Security (TLS) sensitive data can be protected.

The communication between credentials database 126 and authentication module 122 is performed via Java Naming and Directory Interface (JNDI). Network authentication protocol 124 is normally deployed at log-in time to authenticate user 104 in accordance with standard practices known to those skilled in the art.

Prior to describing the operation of network 100 and subsequent embodiments of the invention, it is important to review a number of aspects related to initialization, mappings, definitions and setup. Specifically, prior to operating network 100 the modules have to be properly configured and appropriate definitions have to be assigned. Many of the steps are not specifically called out in the drawing figures, since a person skilled in the art will appreciate how to execute them without the need of additional illustration.

Description of Roles and the Role Mapping Process

As one of the initialization steps, an administrative account (not shown) needs to set up a logical hierarchy of roles in role mapping component 116 to be used as a part of the Role Based Access Control (RBAC) model to enforce permissions based on user assigned list of roles. The roles need to be mapped to corresponding groups in credentials database 126 (preferably OpenLDAP) in order to provide a mechanism to automatically retrieve and assign correct roles to users (e.g., user 104) during the login procedure.

A list of role hierarchies determines the specific subset of permissions that a user has. The list of permissions in the system is predefined and covers most of user interface (UI) functions available in UI components of network 100 and in networks described in subsequent embodiments. Exemplary functions include but are not limited to: PERM_RUN_HIVE_JOB, PERM_READ_HDFS, PERM_RUN_OOZIE_JOB.

An example of a role allowing one to perform map-reduce jobs is: ROLE_MAPRED_OPERATOR. This role can be mapped to OpenLDAP 126 group called "MapredOperator" by the administrator via his or her administrative account during the initialization process. Information about this mapping is preferably stored in a local database belonging to role mapping component 116 or in some other storage means available to security layer 102.

As a part of the initialization process, the administrator also needs to assign a list of predefined permissions to roles, such as ROLE_MAPRED_OPERATOR, which will define a scope of permitted operations in UI components when this role is assigned to a given user. For example, a list of permissions of role ROLE_MAPRED_OPERATOR can include: PERM_EXECUTE_MAPRED_JOB, PERM_DELETE_MAPRED_JOB, PERM_CREATE_MAPREDUCE. Mapping between role and the set of permissions is also stored in a local database belonging to role mapping component 116 or in some other storage means available to security layer 102.

It should be noted that a wide variety of roles can be defined, including, for example, administrative roles and user roles. A list of such roles can include: ROLE_ADMIN, ROLE_HDFS_USER, ROLE_BASE_UI_PERMISSIONS. The role hierarchy is typically represented as a classical tree structure (tree without loops). Each node of the tree is a role that can contain one parent and many children. Each role is defined by its collection of permissions. It also possesses all of its children permissions and is represented by a set or a collection of unique permissions. To illustrate, consider role A being characterized by permissions {a,b,c} and containing children roles B and C. Role B is characterized by permissions {b,c,d}. Further, consider role C having permissions {c,d,e}. In that case, role A possesses permissions {a,b,c,d,e}.

Authentication Module Workflow

Following is a detailed description of the interaction between authentication module 122 and a user request:
1) User 104 tries to log in to services 106 via the corresponding UI by sending an authentication request through the UI component to authentication module 122.
2) Authentication module 122 connects to credentials database or OpenLDAP 126 and verifies credentials 128 of user 104.
3) If user 104 was not authenticated by OpenLDAP 126, then authentication module 122 returns corresponding error code to user 104 and the authorization flow completes.
4) If user 104 was successfully authenticated by OpenLDAP 126, then authentication module 122 passes execution flow 123 to role mapping component 116 as described below.

5) Role mapping component 116 sends a request 125 to OpenLDAP 126 to get all groups that are associated with active user 104.
6) If the set of groups that are retrieved from OpenLDAP 126 is different from the one stored in local database of mapping component 116 (or local database of security layer 102), then the set of groups from OpenLDAP 126 takes precedence and the list of groups found in the local database is refreshed with a list from OpenLDAP 126.
7) Role mapping component 116 establishes the mapping between permission groups retrieved from OpenLDAP 126 with local roles stored in the local database.
8) Role mapping component 116 delegates back to authentication module 122 a list of resolved roles for user 104 and authentication module 122 creates a session object for user 104.
9) Final session object includes information about user 104, such as username, first name, last name, along with a list of roles assigned to user 104.

Multi-Tenancy Support

The Hadoop Distributed File System (HDFS) implements a permissions model for files and directories that shares much of the POSIX model. Each file and directory is associated with an owner and a group. The file or directory has separate permissions for the user that is the owner, for other users that are members of the group, and for all other users. For files, an r permission is required to read the file, and a w permission is required to write or append to the file. For directories, the r permission is required to list the contents of the directory, the w permission is required to create or delete files or directories, and an x permission is required to access a child of the directory.

In contrast to the POSIX model, there are no sticky, setuid or setgid bits for files as there is no notion of executable files. For directories, there are no setuid or setgid bits directory as a simplification. The Sticky bit can be set on directories, preventing anyone except a superuser, directory owner or file owner from deleting or moving the files within the directory. Collectively, the permissions of a file or directory are referred to as its mode.

Each client process that accesses HDFS has a two-part identity composed of the user name, and groups list.

Whenever HDFS must do a permissions check for a file or directory foo (foo being a generic designation familiar to those skilled in the art) accessed by a client process, the following decision tree is implemented:
  If the user name matches the owner of foo, then the owner permissions are tested;
  Else, if the group of foo matches any of member of the groups list, then the group permissions are tested;
  Otherwise the other permissions of foo are tested. If a permissions check fails, the client operation fails.

Multi-Tenancy Module

Security layer 102 also includes a multi-tenancy module 115, which communicates with OpenLDAP 126 to retrieve OpenLDAP groups and OpenLDAP users associated with those groups and map them to organization units (described below). Since default HDFS only provides basic POSIX Permission model and doesn't have support for Access Control Lists (ACLS), multi-tenancy module 115 of the present invention provides support for multi-tenant environment in single-namenode HDFS, bypassing existing limitations of HDFS Permission model.

Multitenancy module 115 introduces organization units (OU)—logical structure to facilitate multi-tenancy environment and act as isolation unit in HDFS. An organization unit represents a logical part of organization, subgroup or department within one company. As an example, "CompanyA" has logical divisions within its organization, e.g. "Accounting", "HR Department".

Each department has a number of users performing modification of datasets in that department. Organization unit represents such a unit and functions as an isolation point from another unit, so that users of "HR Department" will not be able to browse files, shared documents, MapReduce jobs of users within "Accounting Department" and vice-versa.

Every organization unit is associated with two OpenLDAP membership groups, one for common users of the organization unit and another one for administrators of organization unit. For example, during configuration of the organization unit called "Accounting", cluster administrator will need to provide which group in OpenLDAP 126 will be mapped to users of "Accounting" organization unit in OpenLDAP 126, e.g. "AccountingUsers", and another one for administrative users of "Accounting" organization unit, e.g. "AccountingAdmins". This mapping is required in order to establish user membership for any specific organization unit, upon first successful login to the system.

Note that it is possible that one user can be a member of multiple organization units, and his/her permissions can be different among multiple organization units.

As an initialization step, the administrator of the cluster will need to create a list of organization units and provide the following items for every organization unit:
  Organization Unit name
  Organization Unit Posix-compliant abbreviation (to be used later in GroupResolver, to generate Posix-compliant groups)
  OpenLDAP Group for administrative users (users having this group in OpenLDAP will have administrative privileges in this organization group, and will be able to access files of common users of this organization group)
  OpenLDAP Group for common users (users having this group in OpenLDAP will have regular permissions in the organization group, and will not be able to access unshared files of other users of the same organization unit)

The following is an example of data needed to set up an organization unit:
  Organization Unit Name—"Human Resource"
  Organization Unit Posix-abriviation—"hr"
  OpenLDAP Group for Administrative Users: "HRAdmins"
  OpenLDAP Group for Common Users: "HRUsers"

Organization unit data and mapping between OpenLDAP group for administrative users and common users is preferably saved in the local database. OpenLDAP group for administrative user is referred as "OU_ADMIN" later in this document and group for common users is referred to as "OU_USERS".

Every administrative and common user that is a part of the organization unit has a dedicated home folder. This folder can be accessed only by this user and through the administrative account pertaining to the same organization unit. If a given user belongs to two or more organization units, then such user will have a home folder under each organization unit, respectively.

During installation and setup phase, the administrator initializes the folder structure on HDFS with one or more organization units. Each organization unit follows the folder structure convention described in template. The template file describes folder structure, permissions, file owners.

Directory Template

When the cluster administrator sets up HDFS-based storage for a company he/she needs to make sure the environment provided supports all aspects of multi-tenancy and also that the directory structure follows some predefined template and is consistent across various organization units. The directory template is provided to ensure compliance with these prerequisites.

A directory template can be represented as an XML file, which describes the rules of generating actual HDFS folders structure (alongside with filesystem-level permissions) based on the set of organization units that are provided. Template file describes the structure of HDFS filesystem from the directory root down to the level of individual user home folders. Physically the template is normally stored in the local database. There may be several directory templates present in the system, and any one of them can be optionally marked as the default template. Administrative users are provided with a UI to create new templates, modify existing ones and so on. When administrator user sets up HDFS storage, he/she needs to follow the following steps:

Create a list of organization units that need to be present on HDFS storage as described in the previous section;
Select a predefined directory template;
After these steps, the HDFS Adapter of multitenancy module 115 will convert the organization unit data structure into a list of HDFS commands to create actual filesystem structure for the organization unit on HDFS.

An exemplary template file may be configured as follows:

```
<?xml version=" 1 . 0 " encoding="UTF-8"?>
<template name="SampleTemplate">
    <orgunit permission="drwxrwxr-x" owner="superuser" group="OU ADMIN">
        <users permission="drwxr-x---"
        owner="OU ADMIN" group="OU
        USERS">
            <homefolder default_content_permission="drwxrwx---"
            permission="drwxrwx---"
            owner="HOME_FOLDER_OWNER"
            group="HOME_FOLDER_OWNER">
                <genericFolder name="Private MapReduce Jobs"
                permission="drwxrwx---"
                owner="HOME_FOLDER_OWNER"
                group="HOME_FOLDER_OWNER" />
                <genericFolder name="Private HDFS Files"
                permission="drw-rw----"
                owner="HOME_FOLDER_OWNER"
                group="HOME_FOLDER_OWNER" />
            </homefolder>
        </users>
        <genericFoldername="shared" permissi on="drwxrwx---"
        stickybit="true"    owner="OU_ADMIN"
        group="OU_USERS" />
    </orgunit>
</template>
```

The above template represents the following functionality:
For each Organization Unit that is provided generate an HDFS folder with according POSIX permissions, set folder owner to be superuser and folder group to be an automatically generated name based on OpenLDAP group mapping for Organization Unit Administrators.
Under each Organization Unit generate 2 folders (with accordingly set POSIX permissions, owner and groups): users and shared.
Under users folder, generate home folder for each user named after him/her, set permissions according to the template, within each home folder generate 2 folders named Private MR Jobs and Private HDFS Files accordingly.

HDFS Adapter

Whenever changes are made to the state of multi-tenancy module 115 they are synchronized with the HDFS file system layer. HDFS Adapter covers the following scenarios:
During initial cluster roll-out, cluster administrator defines HDFS file structure based on the company organization and applies permissions to it;
When subsequent changes are made to HDFS structure, the latter is synced with the internal security model.
HDFS Adapter module's function:
Analyze the state of multi-tenancy module 115 and transform it to the sequence of HDFS commands which generate the file system corresponding to the model with the defined organization units.
Remember subsequent changes made to the state of multi-tenancy module 115 and generate a diff-patch to HDFS (also sequence of HDFS commands which sync the HDFS state with internal the defined organization units).
Reconstruct the state of multi-tenancy module 115 based on provided HDFS snapshot and template file, used initially to generate the organization unit file structure.

Having reviewed the important aspects of initialization, mappings, definitions and setup, we now return to operating network 100 to examine its operation. Security layer 102 is designed for monitoring of authorization-exceeding modifications performed by user 104 of services 106 in distributed network 100. In other words, security layer 102 is designed to thwart authorization-exceeding modifications by users 104 who are already authenticated, logged in and typically only accessing and deploying services 106 for which they are authorized.

Authorization-exceeding modifications are detected by operating security layer 102 in a mode where snapshots 128', 129' are taken of a baseline role mapping 128 between available services 106 and requisite user permissions 120, along with baseline membership mapping 129 between available organization units and user membership or current membership mapping 121 in these organization units. Specifically, snapshots 128', 129' are taken at time intervals 130 defined by an application configuration.

Time intervals 130 are long enough not to be disruptive to deployment of services 106 on distributed network 100. On the other hand, time intervals 130 are short enough to ensure that the effect of any authorization-exceeding modification that may have been effectuated by external unauthorized user 104 (i.e., a malicious user who tries to modify the underlying database with baseline security policies in order to gain administrator (or root) privileges to user account that is not supposed to have such permissions) has not provided unauthorized access to restricted resources to such unauthorized user 104 for an extended time.

It is important that snapshots 128', 129' be compared at time intervals 130 with current role mappings in role mapping component 116 and organization unit memberships 121 in multi-tenancy module 115. When, based on comparison with snapshots 128', 129' security layer 102 detects that user 104 is an unauthorized user who has managed to tamper with underlying database and extend the permissions, then role mapping component 116 should adopt counter-measures. The same applies to multi-tenancy module 115 when an unauthorized user has managed to change user's current membership mappings to one or more of the organization units.

The counter-measures are to protect the system and to prevent further illegal access until the problem is resolved by the cluster administrator. Thus, a reasonable time interval 130 is on the order of 5 minutes. However, since verification of current role mapping 118 in role mapping component 116 and current membership mapping 121 in multi-tenancy module 115, both belonging to security layer 102, with snapshots 128', 129' residing in secure storage 132 is not a computationally intensive process, even more frequent verifications of baseline policies, i.e., shorter time intervals 130, will not jeopardize system performance.

Preferably, snapshots 128', 129' are stored in a remote, secured location such as a secure storage 132. For added safety, secure storage 132 is only accessible to security layer 102 via a secured sockets layer (SSL) connection 134.

Now, distributed network 100 operating in accordance with the invention can effectively monitor authorization-exceeding modifications attempted by user 104. Under normal conditions, user 104 will not be able to expand permissions through frontend if user 104 initially was not granted permissions to edit or modify other user's permissions. However, user 104 can modify underlying permissions stored in a corresponding local database (e.g., see local database 226 below). For example, user 104 could exploit the root account and modify entries in the local database. When this occurs, after the next time interval 130, role mapping component 116 will compare current, now expanded permissions based on the authorization-exceeding actions of user 104, with snapshot 128' from secure storage 132. The same applies if user 104 manages to tamper with membership mappings. In that case, during the comparison of the current membership mapping 121 in multi-tenancy module 115 with the baseline membership mapping 129 as found in snapshot 129' will be found to be incompatible.

In detecting inconsistencies between snapshots of baseline role and membership mappings, network 100 preferably not only detects the difference but also locates the record that was modified (expanded). Upon the discovery, security layer 102 can take appropriate actions, including notifying an administrator, reset to baseline role mapping, forceful logout and blocking of user 104.

Once an authorization-exceeding modification to permissions 120 by user 104 is detected when comparing current role mapping 118 with baseline role mapping 128, a number of counter-measures and/or responses can be taken. In the preferred embodiment, the response of security layer 102 involves a resetting or restoring function or step 136 in which current role mapping 118 in role mapping component 116 is reset to baseline role mapping 128 in the most recent snapshot 128'. Similarly, a resetting or restoring function or step 137 can be performed in which current membership mapping 121 is reset to baseline membership mapping 129 resulting in restoration of baseline assignments to organization units from the most recent snapshot 129'.

Additionally, as indicated above, security layer 102 can execute counter-measures to further prevent authorization exceeding modifications. For example, role mapping component 116 and/or multi-tenancy module 115 can detect what policies and mappings were modified and the user accounts involved in modifications; these can be temporarily blocked. In the worst case scenario, security layer 102 can shut down any particular cluster 108 or in extreme cases even entire distributed network 100 in order to prevent any further actions initiated by user 104.

Steps 136, 137 are simple, as they involve a straightforward data transfer and over-write operations. At the same time, such functioning of security layer 102 protects distributed network 100 and prevents down-time whenever access to distributed network 100 by user 104 performing authorization-exceeding actions is detected.

The high-level diagram of FIG. 1 is instructive for understanding the high-level aspects of the invention. To better understand the implementation and additional aspects, we now refer to the diagrams of FIGS. 2A-B for a more detailed review of the preferred embodiment of a distributed network 200 with a security layer 202.

Figure 2A:
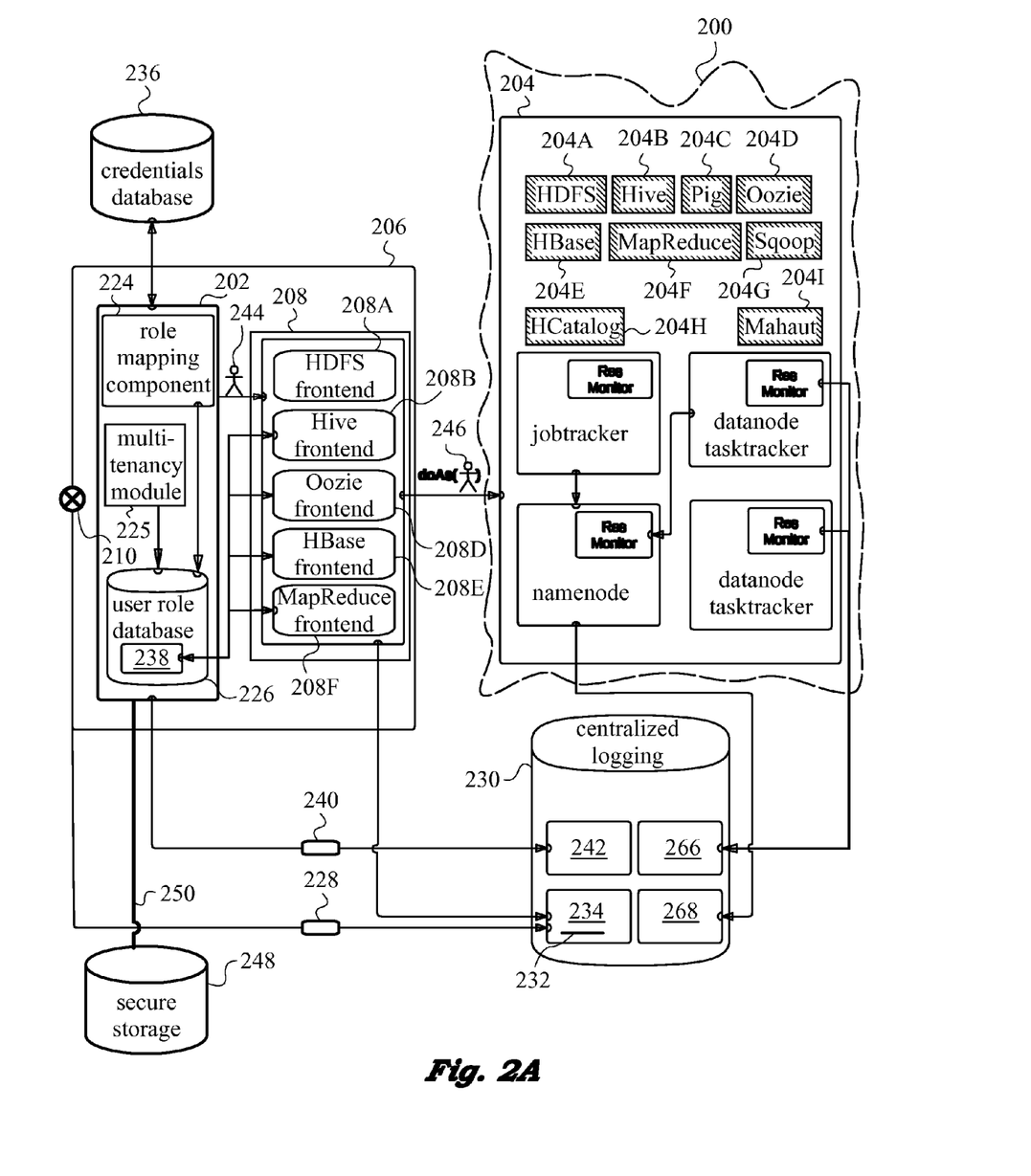
FIG. 2A-B are diagrams of two portions of a preferred embodiment of a distributed network with a security layer according to the invention.

Turning first to FIG. 2A, we note that distributed network 200 has one or more clusters that are geographically separated but not specifically indicated. In this embodiment, the service supported on network 200 includes one or more distributed services. These services preferably include Hadoop 204 and any Hadoop subcomponents or Hadoop based projects, such as Hadoop Distributed File System (HDFS) 204A, Hive 204B, Pig 204C, Oozie 204D, HBase 204E, MapReduce 204F, Sqoop 204G, HCatalog 204H, Mahaut 204I and the like.

In the preferred embodiment, security layer 202 is a part of an additional security service 206. Security service 206 is responsible for user authentication, authorization and fine-grained auditing of user-specific operations. Security service 206 is also coupled to various Hadoop subcomponent frontends 208 that facilitate user interaction with the distributed services, in this example with Hadoop 204. In the present case, frontends 208 include for exemplary and non-limiting purposes an HDFS frontend 208A, a Hive frontend 208B, an Oozie frontend 208D, an HBase frontend 208E and a MapReduce frontend 208F. Furthermore, security service 206 has a unified point of entry 210 for all user calls to Hadoop 204 and its subcomponents 204A, . . . , 204I.

Figure 2B:
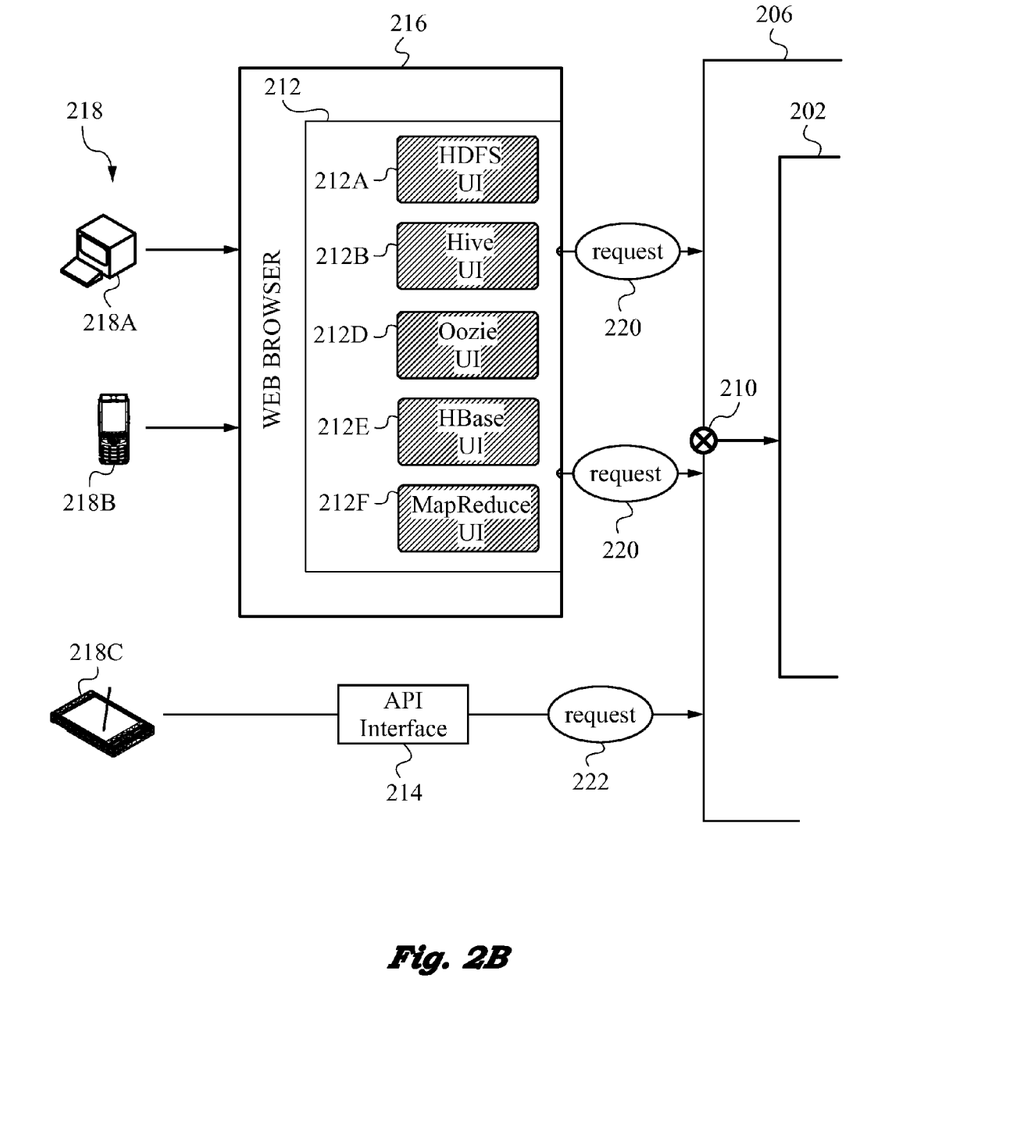

Referring now to FIG. 2B, we note that security service 206 is configured for calls coming from user interface (UI) components 212 or from an application program interface (API) 214 to Hadoop subcomponents 204A, . . . , 204I. Exemplary UI components 212 shown here simply correspond to frontends 208A, 208B, 208D, 208E, 208F explicitly called out in security service 206. Thus, they include a HDFS UI 212A, a Hive UI 212B, an Oozie UI 212D, an HBase UI 212E and a MapReduce UI 212F.

UI components 212, in turn, are accessed through a web browser 216 to which users can connect via a suitable communications network using client equipment 218. Specifically, client equipment 218 can include any suitable client device such as a desktop computer 218A, a smartphone 218B or other mobile or stationary device with suitable on-board processing resources and connectivity to log into web browser 216 and access UI components 212.

Alternatively, client device 218C, in this case a tablet, makes a direct connection using API 214. This alternative is enabled when security service 206 exports its API 214 for access by users with their equipment, such as client device 218C in the case shown here. A person skilled in the art of software and applications development will be familiar with the process required to develop and make APIs 214 available to clients.

In the preferred embodiment users thus have the option of accessing distributed service 204, in this case Hadoop, available on network 200 through UI components 212 or by direct API call via API interface 214. In the case of direct access via API interface 214, the user can use a Web Service, Java, or through binary protocol such as Thrift or Protocol Buffers. In either case, the user sends a request 220, 222 to execute a specific task or method on one of Hadoop subcomponents 204A, . . . , 204I. Two requests 220 are shown in FIG. 2B originating from client devices 218A and 218B, respectively. Any legitimate request 220, 222 includes user credentials along with the command and its parameters. For example, the command and parameters may be as follows: command: "remove", parameter: "/path/to/file/on/hdfs".

All requests 220, 222 pass through single point of entry 210. Thus, security layer 202 in security service 206 can ensure that calls or requests 220, 222 coming either via UI components 212 or directly via API interface 214 to Hadoop subcomponents 204 are only passed to the corresponding frontends 208 upon authentication and authorization. In accordance with the invention, security layer 202 performs the authentication and authorization process.

To review the authentication and authorization steps, we now refer back to FIG. 2A. Here we see that security layer 202 has a role mapping component 224, a multi-tenancy module 225 and a local database 226. Once security service 206 receives any request, such as request 220 or 222, its unified point of entry 210 acts as an interceptor and generates an asynchronous event 228. Event 228 is sent to a centralized logging component 230 to create a log record 232 of user's requested action in a user activity log 234. After successful generation of event 228 and its log record 232, any request, e.g., request 220 or 222, proceeds to security layer 202, which parses request 220, 222 and extracts user credentials.

User credentials contained in request 220, 222 are verified against a credentials database 236. As in the previous embodiment, the preferred credentials database 236 is OpenLDAP. Verification of user credentials with database 236 is performed through the standard Java Naming and Directory Interface (JNDI) known to those skilled in the art.

Upon successful verification of credentials, as described above in the section entitled Authenticaction Module Flow, security layer 202 retrieves roles and permissions associated with current user from local database 226 and creates a user object 244. Security layer 202 scans through available permissions for the user and either allows or denies request 220, 222 to proceed. The reasons for denial to proceed can be a result of insufficient permissions to access specific Hadoop component 204, system object or unauthorized access to other user's space.

As an example, user may lack permissions to execute specific action on map reduce Oozie job object. For example, if user object 244 has the following hierarchy roles:
ROLE_MAPRED_DEVELOPER<ROLE_HDFS_
OPERATOR<ROLE_BASE_UI_PRIVILEGES
where "<" means "inherits", then none of the listed roles will contain a set of permissions associated with Oozie UI component 212D. Therefore, the user will lack privileges to execute any operation on Oozie component 212D.

Security layer 202 may establish a session for authenticated user in order to skip authentication step for consequent method invocations or requests. In case of successful or failed authorization/authentication attempt security layer 202 generates a log event 240 which includes date, time, user object 244, requested action, result of applied policies and permissions 238 towards user and its request 220, 222. Security layer 202 also asynchronously sends log event 240 to the centralized logging component 230. Preferably, log event 240 is stored in a separate security log 242 belonging to centralized logging component 230.

If user is authorized to execute requested action then request 220, 222 is passed to corresponding frontend 208. Otherwise request 220, 222 is returned to the user's client device 218 (see FIG. 2B) with a corresponding error message.

Frontend 208 serves as a facade for client object 244 of Hadoop 204, which communicates directly with corresponding Hadoop subcomponent 204A, . . . , 204I. Frontend 208 executes client's custom initialization (for example, in the case of Hive subcomponent 204B, it needs to instantiate CliSession object and associate it with current user), then frontend 208 creates a proxied user object 246 based on authenticated user object 244 using standard Hadoop interface provided by UserGroupInformation.createProxyUser method. Once the initialization is complete, frontend 208 associates provided User object 246 with the JAAS current access control context and proxies all invocations to Hadoop subcomponent 204 client through JAAS "doAs" method provided by UserGroupInformation interface.

Information about Hadoop subcomponent's 204A, . . . , 204I actions, such as a Map Reduce job, a Hive job, an Oozie workflow, a Pig job are stored in user database 226 and associated with a predefined list of permissions 238. Such approach allows for fined grained control over user permissions. For example, a user assigned to role "Research" might not have permissions to access Oozie workflows and Hive jobs created by user who belongs to role "Finance department".

FIG. 2A further shows that upon successful authentication and authorization user's request 220, 222 is forwarded via authenticated user object 244 to distributed service 204, in this case Hadoop on one or more clusters in network 200 to perform the required action. This action can be a set of Map Reduce jobs generated by a Hive query, or access to data stored in HDFS 204A.

According to the invention, security layer 202 is also connected to a secure storage 248. The latter is a hardware encrypted data storage in the preferred embodiment. Secure storage 248 is preferably connected to security layer 202 by a secured sockets layer (SSL) connection 250. Storage 248 contains snapshots of baseline role mapping of security policies between available services 204, in the present example between Hadoop and its requisite permissions. Note that a policy is simply the set of initial permissions granted at the time of user creation. The snapshots are taken and stored in storage 248 at time intervals dictated by the application configuration.

Authorization-exceeding request 220, 222 of an authorized user are detected by comparing the current security policies in user database 226 against the most recent snapshot of the baseline role mapping of security policies in secure storage 248. The response of security layer 202 to such authorization-exceeding request 220, 222 involves a resetting or restoring function or step in which current role mapping in role mapping component 224 is reset to baseline role mapping in the most recent snapshot. Alternatively, as indicated above, the response can involve other counter-measures such as forceful logout and temporary blocking of users whose records in permission mapping has changed since the last time a baseline snapshot was taken.

Figure 3:
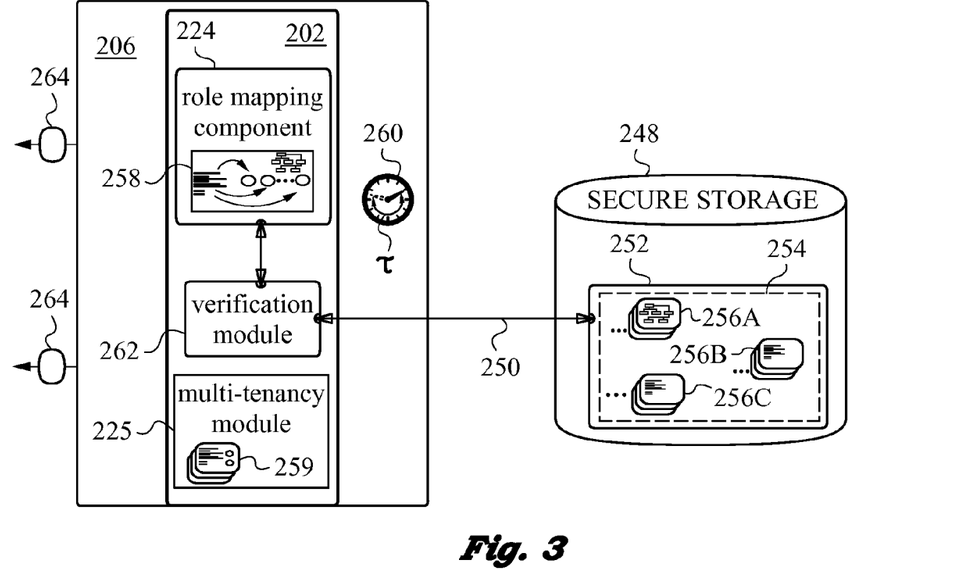
FIG. 3 is a diagram showing in more detail the security measures involved in taking and storing snapshots of baseline security policies in the preferred embodiment of FIGS. 2A-B.

FIG. 3 illustrates in more detail the security measures involved in taking and storing snapshots of baseline security policies in the preferred embodiment. FIG. 3 deploys the same reference numerals as FIGS. 2A-B to label corresponding parts.

In particular, FIG. 3 shows secure storage 248 located outside security services 206. As indicated above, storage 248 is preferably a hardware encrypted secured storage with SSL connection 250 made directly to security layer 202 in security service 206. Storage 248 has a snapshot database 252 dedicated to storing snapshots 254 of baseline security policies 256. Baseline security policies 256 include baseline role mapping 256A, baseline permissions associated with the roles, association between users and baseline roles 256B, association between users and their membership in organization units 256C, which all together constitute the set of baseline security policies.

Snapshots 254 of security policies 256 are compared against current security policy 258 in role mapping component 224 and against current membership mapping 259 to organization units in multi-tenancy module 225. The comparison is performed after each time period or interval τ that is preferably measured by a local clock 260. Typically, local clock 260 is synchronized with a global clock (not shown) in a manner to ensure minimal clock skew with respect to distributed network 200. Local clock 260 is typically the reference clock for security service 206. However, it is also possible to use a dedicated clock local to security layer 202 only.

Depending on time interval τ specified in application configuration security service 206 will execute a difference comparison of existing policies with baseline security policy snapshot 254 and will collect information about modified elements. This information will be logged to centralized logging component 230. Sometimes change in the policies will be triggered by API call 220 to role mapping component 224 and to multi-tenancy module 225 by authenticated and authorized user with sufficient permissions to modify other user's permissions (e.g., by the cluster administrator) or user's membership status in organization units.

Upon successful transaction, updated copy of baseline policies will be pushed to secure storage 248 and will become a new master copy of baseline security policies. Security service 206 will trigger comparison based on the value of pre-configured time interval τ. Generally, time interval τ is about 5 minutes, however shorter time intervals are possible, since this operation is not CPU intensive and will not impact cluster performance. Note that shortening time interval τ can increase intrusion awareness proportionately.

This aspect of the present invention ensures the ability to monitor and prevent user's fraudulent activity. Specifically, it is an aspect of the invention to monitor and thwart the issuance of commands in an attempt to perform authorization-exceeding modifications. This happens when an unauthorized user performs outside activity of manual modification of user database 226 containing information about user policies, their granted permissions and membership in organization units. If successful, such modification would allow further execution of unauthorized commands in cluster and access to unauthorized resources on HDFS.

In the preferred embodiment a verification module 262 is used to download baseline security policy snapshot 254 from remote secured location 248 through SSL connection 250. Once successfully downloaded, baseline security policy snapshot 254 is compared to existing policies 258 in role mapping component 224 and in multi-tenancy module 225. If discrepancy is detected, security service 206 will be notified by verification module 262.

Upon notification, security service 206 can take various counter-measures, which can be configured per cluster. Thus, security service 206 can notify an administrative contact and report the event. In doing so, it reports about the user accounts with changed policies that it has detected. Further, security service 206 can temporarily block such users issue a forceful logout. Optionally, it can suspend access to the cluster until the administrative contact resolves the event manually. As an alternative option, it can stop cluster operation in order to prevent further fraudulent actions. If security service 206 is configured only to send notifications to administrative contact, then it can start returning "temporarily unavailable" error status code as a response 264 to the users while updating defected security policy 258 with a baseline snapshot copy 254.

All authenticated, logged-in users will be forcefully logged out from the system in order to prevent further malicious actions executed by the fraudulent user. As shown in FIG. 2A, security service 206 in the preferred embodiment logs all user activity to remote and secured centralized logging system 230 for added safety. In fact, logging system 230 contains specific logs 266, 268 for this purpose. Of course, this applies to many embodiments, since in general an audit trail for any action can be provided with the aid of logs 266, 268.

Among the logged activity, logs 266, 268 will contain a secure record of the jobs produced in distributed network 200 by the fraudulent user's actions. These will have been performed during time interval τ between baseline policy verifications. The records from logs 266, 268 can be later analyzed by administrators in order to determine whether or not a particular user has accessed resources or granted rights to other users/groups without appropriate authorization.

Figure 4:
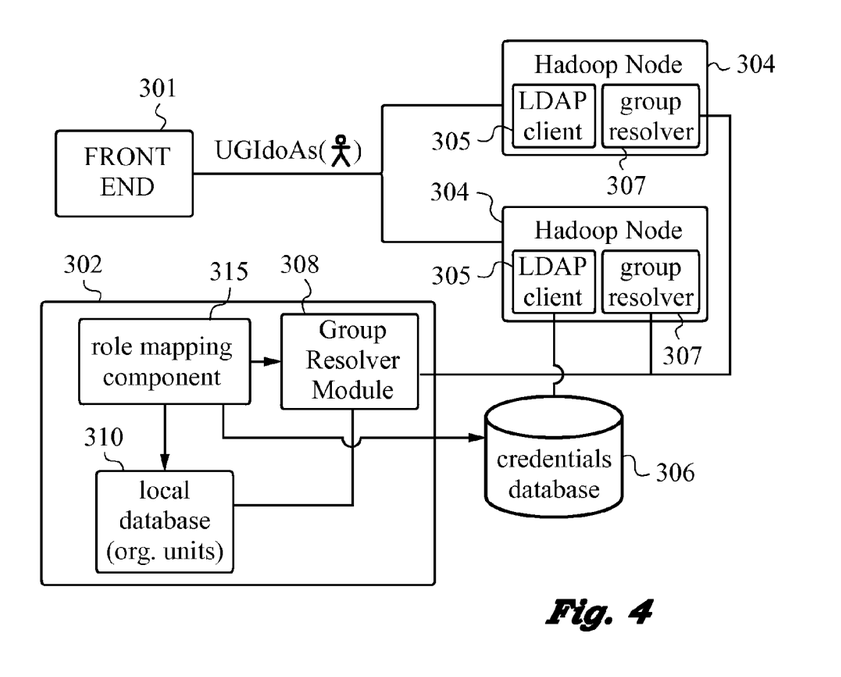
FIG. 4 illustrates an embodiment of the present invention of provisioning users and HDFS Posix-compliant groups to Hadoop cluster using OpenLDAP for user authentication and group resolver for HDFS groups.

FIG. 4 illustrates a portion of a system according to the present invention that may be implemented in conjunction with the preferred embodiment shown in FIGS. 2A-B and FIG. 3 or in a still different embodiment. For this reason, FIG. 4 depicts only the relevant portion of the system that supports provisioning of users and Hadoop group mappings to a Hadoop cluster using OpenLDAP as credentials database 306 for user authentication and group resolver module 308 for user groups. One of the requirements that Hadoop has when it runs with security enabled is that all Hadoop nodes need to have local UNIX users and groups that will be accessing HDFS cluster. Considering that Hadoop clusters in a production system can have anywhere between just a few up to thousands of nodes, it becomes very inefficient and complex to provision UNIX accounts to all nodes.

To address this problem, certain embodiments of the present invention as shown partially in FIG. 4 provide as security layer 202 a multi-tenancy service layer 302. Layer 302 is provided above Hadoop nodes 304, and is in communication with credentials database 306 embodied by OpenLDAP. This topology makes user management transparent for the Hadoop cluster.

For any HDFS operation Hadoop node 304 requires two variables to make a decision whether a user has sufficient permissions to access a file or not. Those variables are: username and group. Username is passed to Hadoop node 304 using standard Hadoop UserGroupInformation.doAs method when any HDFS command is invoked from frontend 301 and group is resolved using GroupResolver client 307 installed on every Hadoop node 304.

In order for Hadoop node 304 to perform any operation, it needs to resolve username to a local Unix user account. By default /etc/passwd file is used to lookup user and user uid to perform any IO (Input/Output operation) on behalf of the user.

Instead of provisioning UNIX user accounts to every single Hadoop node 304, an LDAP client module 305 is installed on every Hadoop node 304. This allows the system to utilize a remote OpenLDAP server 306 for username lookups. In this case it is not necessary to provision UNIX user accounts to all Hadoop nodes 304, as will be appreciated by those skilled in the art.

After Hadoop successfully resolves user account through LDAP client module 305, Hadoop will resolve available groups for the user. In the present embodiment this is provided for by Group Resolver client 307, which connects to group Resolver Server Module 308 in layer 302 over Remote Procedure Call (RPC) protocol. Preferably, module 308 resolves HDFS groups assigned to the specific user based on information stored in a local database 310.

As already described in previous sections, during system initialization an administrative account needs to establish mapping between OpenLDAP groups for common users and administrators and organization units. Every organization unit gets a mapping for two OpenLDAP groups, one for common users and another for administrators. During user login process authentication module 122 queries OpenLDAP for a list of groups assigned to specific user and generates a list of available HDFS groups.

Group Resolver Server component 308 looks up a list of organization units in which specific user is a part of common users or administrative users in local database 310. Based on this information, role mapping module 315 dynamically generates a list of HDFS posix-compliant groups and returns them back to group resolver server component 308 and then communicates back to group resolver client module 307 on Hadoop node 304. Hadoop node 304 uses information about user groups to perform permission evaluation based on default HDFS Posix permission model.

For example, if a user with username "john" has the following groups assigned to him in OpenLDAP: "HRAdmins", "AccountingUser", then user "john" will be associated with two organization units, namely: "HR", "Accounting". User "john" will be listed in Administrative group for organization unit "HR" and in common user group for organization unit "Accounting". Information about this mapping is stored in local database 310 and used by role mapping component 315 to generate a list of HDFS Posix compliant groups when request from group resolver 308 is recieved.

For instance, if Hadoop node 304 sends a request for a list of groups mapped to the user object "john", then group resolver client 307 will connect to group resolver server component 308 over RPC protocol and it will invoke "getPosixGroupsByUser (username)" method of role mapping component 315. Role mapping component 315 will connect to local database 310 and select all available groups for user "john". This list will contain groups "AccountUser" and "HRAdmin". Role mapping component 315 will convert these groups into Posix-compliant group names "accountingUser", "hrAdmin" correspondingly and return back to group resolver server component 308 which will in turn return result to group resolver client module 307. Group resolver client module 307 will provide this information to default Hadoop permission evaluation model, which perform permission evaluation and either grant or deny access to file or resource.

As described in previous sections, HDFS Directory Template is used to generate file structure on HDFS and to assign groups and permissions to every organization unit on HDFS. HDFS adapter, also described above, consumes a list of organization units and a Directory Template to translate object model into a set of HDFS commands and to create HDFS File Structure and to set correct groups and permissions. HDFS Adapter uses role mapping component 315 during organization unit setup process to get correct HDFS Posix-compliant group names for organization unit common users and administrators. The same Posix-group names are later resolved by group resolver 308 when Hadoop node 304 needs to get a list of user groups. Thus, if user "john" is in "AccountingUser" group and HDFS Template was used to generate "Accounting" organization unit, then the same posix group "accountingUsers" will be used to describe common users in "Accounting" organization unit.

Automatically generated list of HDFS Posix-compliant groups allows us to dynamically change user's role and membership in different organization units and either allow or deny access to specific organization units on Hadoop File System. This model enables multitenancy in single-namenode Hadoop environment.

It will be apparent to those skilled in the art, that the present embodiment provides for great flexibility in user management, makes user provisioning to Hadoop nodes 304 much easier and allows an administrator to ensure that user/role permissions and membership in organization units are synchronized and propagated appropriately across all system components. The local definition of the user created in this embodiment is made accessible to all nodes 304 of the distributed network. Such configuration relieves nodes 304 from having to independently provision the user. In creating the local definition, the user can be mapped to at least one of the organization units defined in the security policies. In doing so group resolver module 308 along with LDAP client module 305 can be used to resolve available HDFS groups and the user of the distributed services in the distributed network does not need to be provisioned on all nodes 304 of the network. This is a very advantageous condition.

For further safety, the invention extends to the use of encryption of user data with personal private/public keypairs issued in the distributed network. The encrypting step can be performed by Hadoop Input/Output system.

Figure 5:
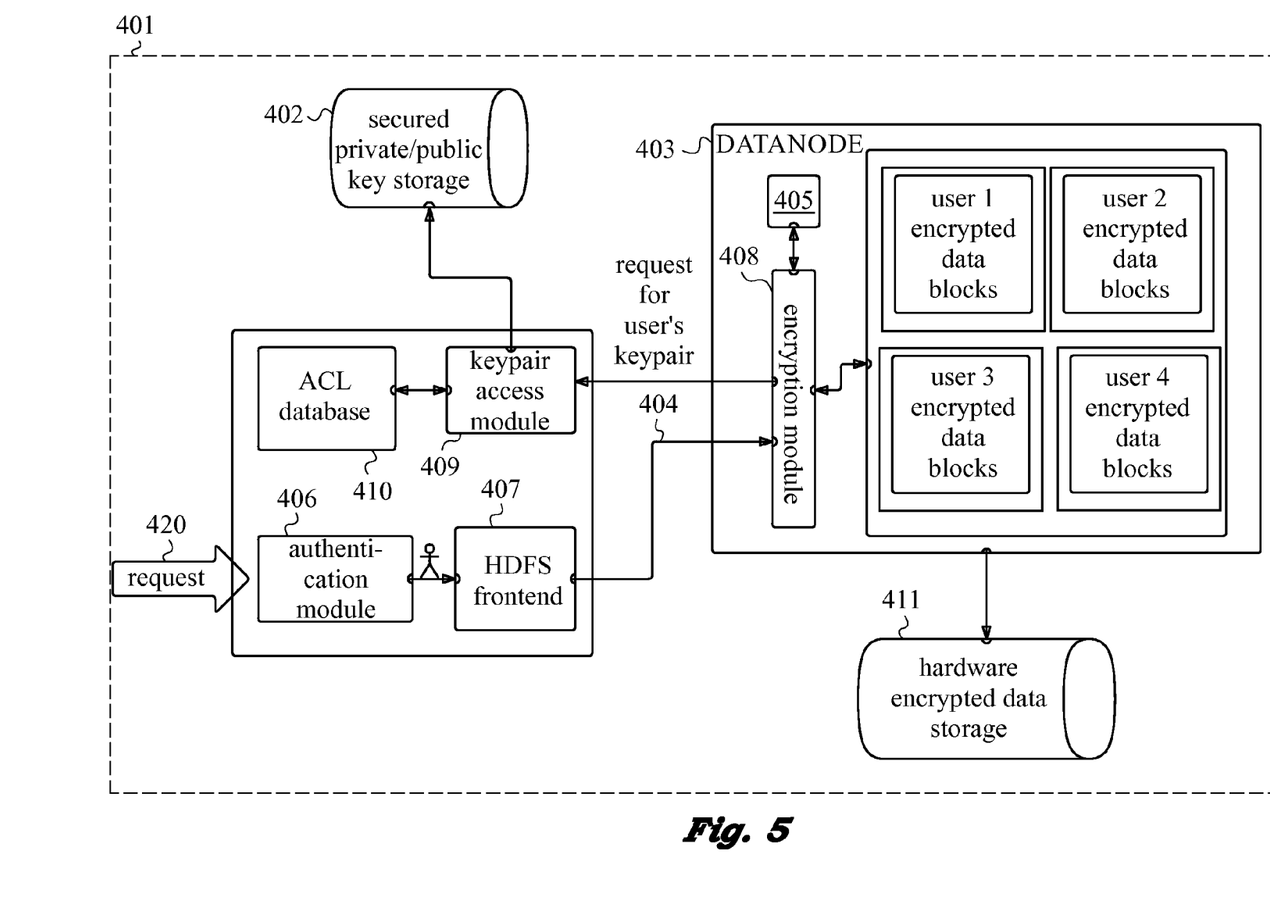
FIG. 5 illustrates an embodiment of the present invention of provisioning user's asymmetric keypair and using it to encrypt user's data stored within a shared Hadoop file system.

Method for encrypting user's data stored in shared Hadoop file system (HDFS) with user's asymmetric keypair is provided in FIG. 5. One of the limitations that Hadoop has is lack of data encryption. Even if Hadoop cluster is operating within Kerberos environment, an attacker can gain control over one or more of the datanodes which physically store data on its local storage space and user's data can be viewed and compromised by the attacker. Present invention addresses this problem by encrypting the user's data with personal private/public keypair through Hadoop IO system. As shown in FIG. 5 keypairs are stored in a secured storage 402 inside of cluster's network 401 in order to minimize network latency, since HDFS read/write operations will require numerous private/public key lookups. Keys can be cached in datanodes memory space 405 for performance reasons. It should be noted, however, that this approach may not be recommended when there is a potential for keypair hijacking from datanode's memory space.

An authentication/authorization module 406 authenticates users based on incoming request 420 and forwards command to HDFS frontend 407. HDFS Frontend 407 establishes a connection 404 with datanode 403 to read or write data. In accordance with the invention, a custom implementation of an Encryption module 408 is provided to use standard Hadoop compression codec interface to perform data encryption/decryption function instead. To obtain the keypair, encryption module 408 connects to Keypair Access Module 409 that is used to determine if user has sufficient permissions to obtain specific keypair. Owner of the data can allow other registered users to view data, so the access to keypairs is managed with an Access Control List (ACL) 410, as is done with other objects in the system (hive jobs, mapreduce jobs, oozie workflows).

As an example, a first user may want to allow a second user to read data, in this case the first user grants permissions to the second user to access the first user's keypair. Information about object permissions is stored in ACL Database 410. Once request for the keypair is successfully returned to Encryption module 408 it performs read/write operation from data storage and encrypts or decrypts collected data. Data is then returned to the user as a response to request 405. Keypairs are generated for every registered user upon first successful authentication. As an additional level of security, datanodes can use hardware devices to encrypt data stored on one or more local storage devices 411.

In view of the above teaching, a person skilled in the art will recognize that the invention can be embodied in many different ways in addition to those described without departing from the spirit of the invention. Therefore, the scope of the invention should be judged in view of the appended claims and their legal equivalents.

I claim:

1. A method for deploying a security layer for monitoring authorization-exceeding modifications performed by a user of services in a distributed network, said method comprising:
   a) providing between said user and said services said security layer having:
      1) a role mapping component imparted with a current role mapping between said services and permissions comprising policies, groups, users;
      2) a network authentication protocol for authenticating said user;
   b) deploying said network authentication protocol at a log-in time to authenticate said user;
   c) taking snapshots of a baseline role mapping and snapshots of a baseline membership mapping of said user in at least one organization unit at time intervals of the order of 5 minutes;
   d) storing said snapshots in a remote secured location accessible to said security layer via a secured sockets layer connection;
   e) comparing said current role mapping with said baseline role mapping and comparing a current membership mapping of said user with said baseline membership mapping when said user performs an action affecting said permissions;
   f) restoring said current membership mapping to said baseline membership mapping;
   whereby authorization-exceeding modifications by said user are monitored by said security layer.

2. The method of claim 1, wherein said current membership mapping is stored in a multi-tenancy module belonging to said security layer.

3. The method of claim 1, wherein said distributed network comprises at least one cluster and said service comprises at least one distributed service, and said method further comprises providing said user with at least one frontend to said at least one distributed service.

4. The method of claim 3, wherein said at least one distributed service comprises Hadoop.

5. The method of claim 4, further comprising at least one project based on Hadoop and selected from the group consisting of Hadoop Distributed File System, Hive, Pig, Oozie, HBase, Map Reduce, Sqoop, HCatalog and Mahaut.

6. The method of claim 1, further comprising the step of restoring said current role mapping to said baseline role mapping.

7. The method of claim 1, wherein said network authentication protocol is executed by an authentication module belonging to said security layer and communicating with a credentials database.

8. The method of claim 7, wherein said step of communicating with said credentials database is performed via Java Naming and Directory Interface (JNDI) and said credentials database is Open Lightweight Directory Access Protocol.

9. The method of claim 1, further comprising:
   a) logging said action in a centralized logging component; and
   b) providing an audit-trail of said action.

10. The method of claim 1, wherein said user is provisioned on substantially fewer than all nodes of said distributed network and said method further comprises logging of jobs produced by said user action in said distributed network.

11. The method of claim 1, further comprising the steps of:
    a) providing a Role Based Security Service Layer in communication with said credentials database; and
    b) creating a local definition of said user;
    whereby said local definition is accessible to nodes of said distributed network thereby relieving said nodes from independently provisioning said user.

12. The method of claim 11, wherein said step of creating said local definition further comprises mapping said user to at least one organization unit.

13. The method of claim 12, further comprising resolving available organization units for said user with a multi-tenancy module.

14. The method of claim 1, further comprising encrypting data of said user with personal private/public keypairs issued in said distributed network.

15. The method of claim 14, wherein said step of encrypting is performed by Hadoop Input/Output system.

16. A non-transitory computer storage medium containing instructions for deploying a security layer for monitoring authorization-exceeding modifications performed by a user of services in a distributed network based on Apache Hadoop architecture, said instructions comprising:
    a) providing between said user and said services said security layer having:
       1) a role mapping component imparted with a current role mapping between said services and permissions comprising policies, groups, users;
       2) a network authentication protocol for authenticating said user;
    b) deploying said network authentication protocol at a log-in time to authenticate said user;
    c) taking snapshots of a baseline role mapping and snapshots of a baseline membership mapping of said user in at least one organization unit at time intervals of the order of 5 minutes;
    d) storing said snapshots in a remote secured location accessible to said security layer via a secured sockets layer connection;
    e) comparing said current role mapping with said baseline role mapping and comparing a current membership mapping of said user with said baseline membership mapping when said user performs an action affecting said permissions;
    f) restoring said current membership mapping to said baseline membership mapping;
    whereby authorization-exceeding modifications by said user are monitored by said security layer.

17. The non-transitory computer storage medium of claim 16, further comprising instructions for restoring said current role mapping to said baseline role mapping.

18. The non-transitory computer storage medium of claim 16, further comprising instructions for:
    a) logging said action in a centralized logging component; and
    b) providing an audit-trail of said action.

19. The non-transitory computer storage medium of claim 16, further comprising instructions for:
    a) providing a Role Based Security Service Layer in communication with said credentials database; and
    b) creating a local definition of said user;

whereby said local definition is accessible to nodes of said distributed network thereby relieving said nodes from independently provisioning said user.

20. The non-transitory computer storage medium of claim 16, further comprising instructions for providing multi-tenancy support in said distributed network based on Apache Hadoop architecture.

* * * * *